United States Patent [19]

Freyman

[11] Patent Number: 4,722,538
[45] Date of Patent: Feb. 2, 1988

[54] SHOPPING CART CAPABLE OF CLIMBING STAIRS

[76] Inventor: Alexander Freyman, 1903 Ocean Ave. Apt. B-8, Brooklyn, N.Y. 11230

[21] Appl. No.: 940,101

[22] Filed: Dec. 10, 1986

[51] Int. Cl.$^4$ .............................................. B62B 5/02
[52] U.S. Cl. .................................. 280/5.32; 280/641; 280/654; 280/DIG. 4
[58] Field of Search .................... 280/5.28, 5.32, 641, 280/645, 651, 652, 654, DIG. 4, DIG.10, 5.2, 43.1

[56] References Cited

U.S. PATENT DOCUMENTS

| | | | |
|---|---|---|---|
| 3,168,328 | 2/1965 | Hill | 280/652 X |
| 3,614,115 | 10/1971 | Berglund | 280/5.32 |
| 3,836,160 | 9/1974 | Linsley | 280/5.32 |

FOREIGN PATENT DOCUMENTS 666654  9/1964  Italy ..................................... 280/651

Primary Examiner—David M. Mitchell
Assistant Examiner—Tamara L. Finlay

[57] ABSTRACT

A shopping cart that utilizes two pivotably connected tubular frames, each frame having two spaced apart legs with an axle carrying wheels extended between them. These frames are pivotably connected in a way which permits the movable frame to be tilted backward thus lifting the front wheels of the cart, and making the cart capable of climbing stairs. When not in use, the whole cart can be easily folded in a space saving unit convenient for storage in a small closet or the like.

9 Claims, 14 Drawing Figures

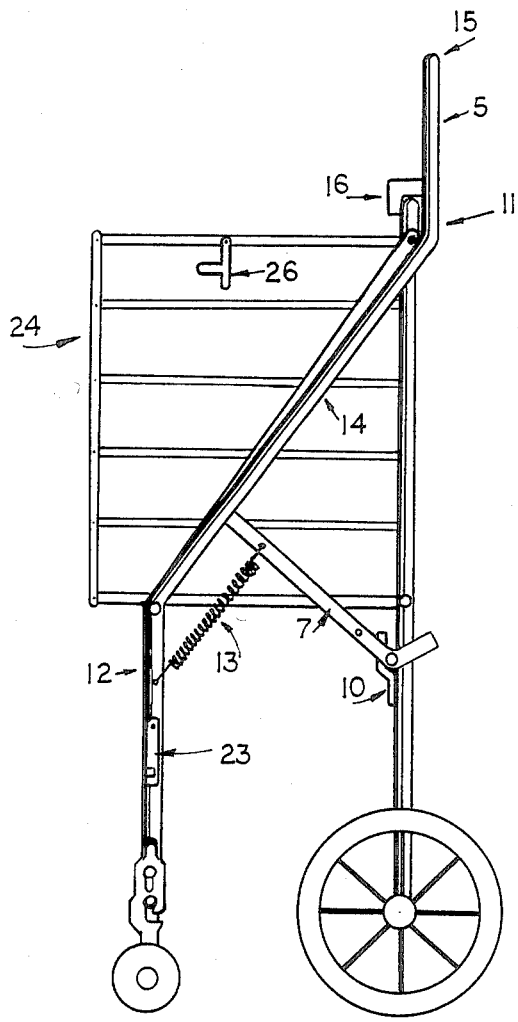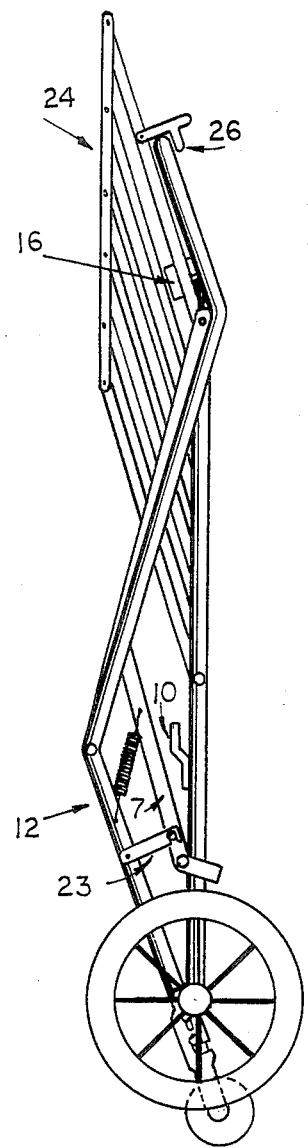
FIG. 2
FIG. 6

SHOPPING CART CAPABLE OF CLIMBING STAIRS

BACKGROUND OF THE INVENTION

The present invention relates to a new and useful collapsable shopping cart capable of climbing stairs. Various forms of carts of this kind are known but the existing constructions are either too complex and expensive, or cannot be conveniently folded into a compact shape for the purpose of storage in a limited space of a closet or the like.

SUMMARY OF THE INVENTION

The present invention will provide an inexpensive, lightweight, convenient collapsable shopping cart capable of climbing stairs.

The invention will include a movable and immovable frame assemblies pivotally connected to one another by means of two diagonal links, and a foldable basket attached to the immovable frame assembly with one end, the other end of said basket rests on an axle supported by said links, which links are pivotably connected to said immovable frame assembly and braced by a support member.

The primary object of the invention is to provide a convenient and inexpensive shopping cart capable of climbing stairs, simple in construction, reliable and efficient in operation.

Another object of the invention is to provide a reliable and inexpensive shopping cart, capable of climbing stairs, and which can be conveniently folded and stored in a small space.

These objects of the present invention will become apparent to those skilled in the art from the following detailed description and accompanying drawings and more particularly defined by the appended claims.

BRIEF DESCRIPTION OF DRAWINGS

The invention will now be described in greater detail and illustrated by the following drawings in which:

FIG. 2 is side elevational view of the cart.

FIG. 6 is an elevational view of the cart in its collapsed storage position.

DETAILED DESCRIPTION OF THE PREFERRED EMBODIMENT

Figure 1:
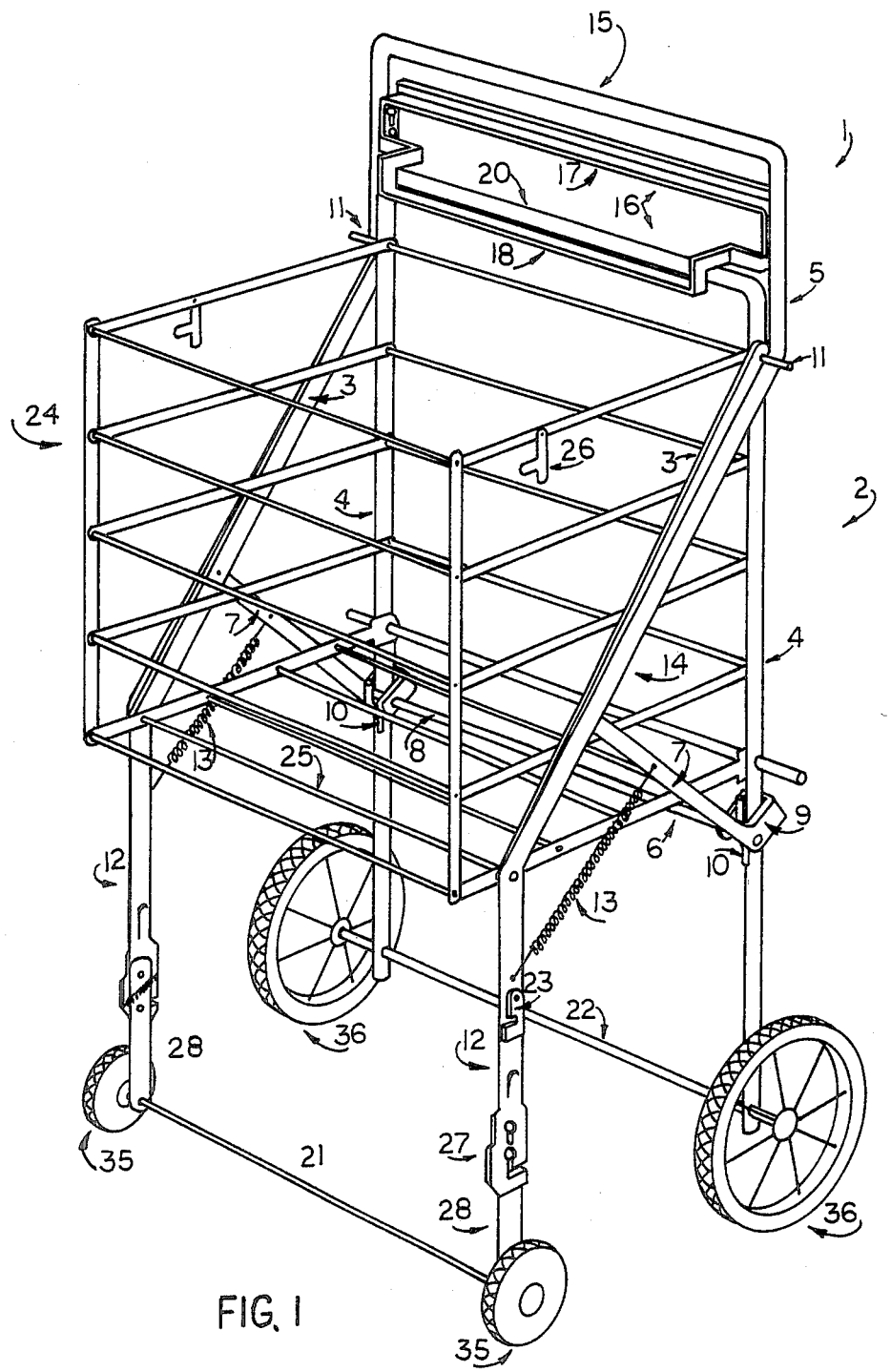
FIG. 1 is a perspective view of the shopping cart of the present invention in its erected position.

Referring to the drawings in particular, the invention embodied therein comprises a shopping cart which includes two frame asemblies, movable and immovable, generally designated 1 and 2 respectively, pivotally connected to each other by means of two diagonal links 3; and a foldable basket 24, pivoted to the immovable frame assembly 2 by its one side, the other side of said basket, when in operational position, rests upon the pivot 25 which extends between the lower ends of said diagonal links 3, said immovable frame assembly together wtih said basket form a body of the cart (see FIGS. 1 and 2).

Each frame assembly comprises a tubular element of a U-shaped configuration of which lower ends form two spaced apart legs, these legs carry a horizontal axle with wheels at their ends.

Figure 9:
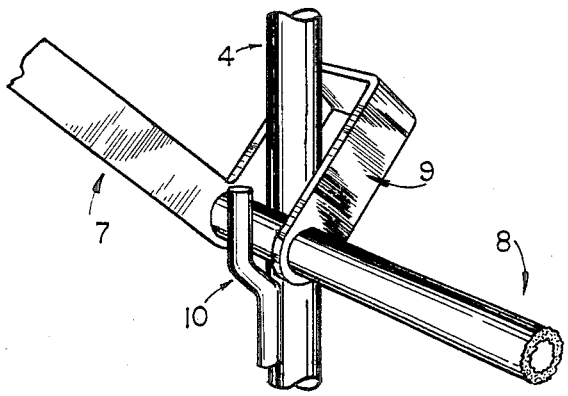
FIG. 9 is an enlarged perspective view of the support member engaged with a hook-shaped lug.

The invention further comprises a movable support member 6, as shown on FIGS. 1 and 9, which includes two substantially parallel braces 7 interconnected at one end by a cross-bar 8 integral with said braces. The cross-bar 8 is slidably mounted on the vertical members 4 of the immovable frame assembly 2. The cross-bar 8 has oblong rings 9 on each side, through which rings the vertical members 4 are inserted in order to secure the sliding vertical movement of the cross-bar up and down side vertical members.

The vertical members 4 have two hook-shaped lugs 10 affixed to their lower portions and engageable with the cross-bar 8 (FIGS. 1 and 9).

Figure 3:
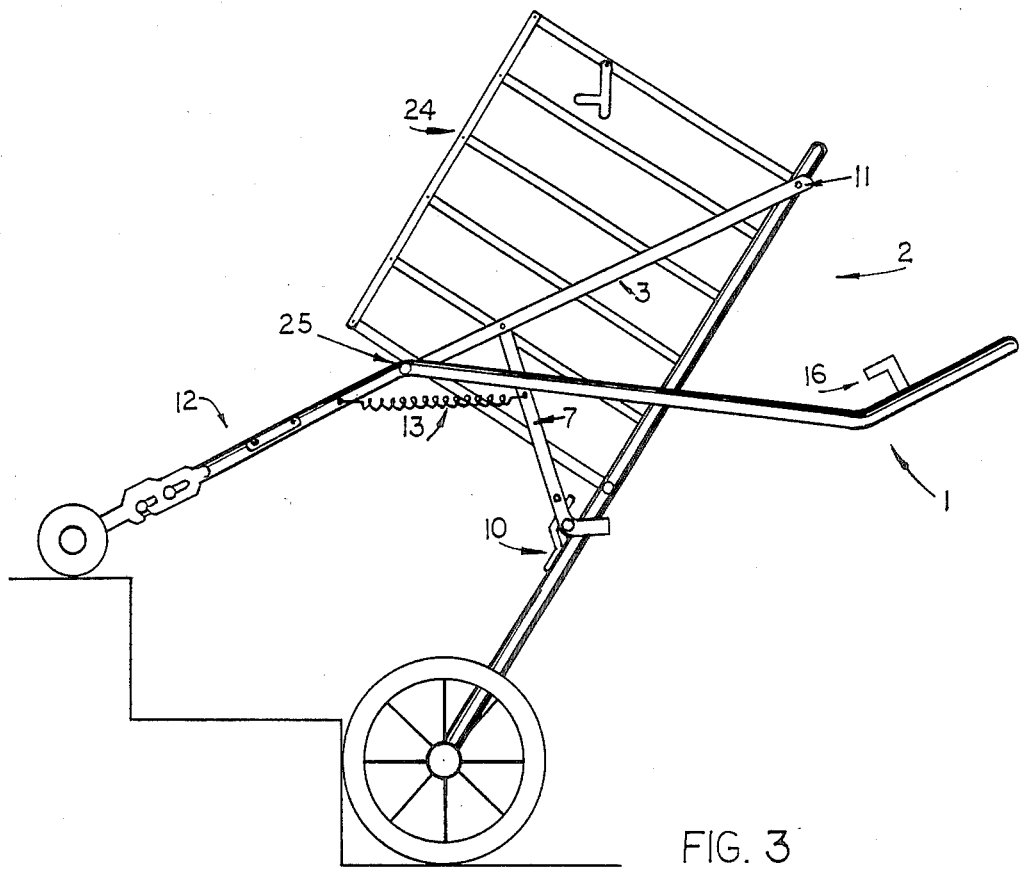
FIG. 3 is a side elevational view of the cart with the front wheels lifted.

The invention further comprises two diagonal links 3 which are pivoated at their middle portions to said braces 7 of the support member 6, as shown on FIG. 3. At their upper ends the diagonal links 3 are pivoted on projecting pins 11, said pins are affixed to the upper portions of the vertical members 4 (see FIGS. 1 and 3). The lower ends of said diagonal links 3 are pivotally connected to the front legs 12 as shown on FIG.3, thus providing a pivotal connection between the two frame assemblies.

When the cart is in the operational position, the cross-bar 8 of the support member 6 is engaged with hook-shaped lugs 10, the spring 13, one end of which is mounted onto the brace 7 and the other on the front legs 12, secures the cross-bar 8 on said lugs, preventing it from an incidental upward movement (FIGS. 1, 2 and 9).

The braces 7 prop against the diagonal links 3 and keep said links a suitable distance from the vertical members 4 of the immovable frame assembly 2.

The lower portions of the diagonal links 3 are connected to the front legs 12 of the movable frame assembly 1 thus keeping said frame in an erected position, and front legs 12—apart from rear legs 37 thus spreading apart the front and rear axles carrying wheels (FIGS. 1 and 2).

The springs 13 mounted on the front legs 12 below the pivot 25 pull the lower part of the movable frame assembly backward, thus pushing the upper portion of said frame assembly forward, said upper portion rests against the projecting pins 11, said pins prevent further forward movement of the upper portion of the movable frame assembly and keep the diagonal portions 14 in an alignment with the diagonal links 3 (FIGS. 1 and 2).

The upper portion of the movable frame assembly 1 includes a cross-member 15 integral with the side tubular members 5, said cross-member forms a handle of the cart, the cart being controlled by the operator through the means of that handle (FIG. 1).

Figure 4:
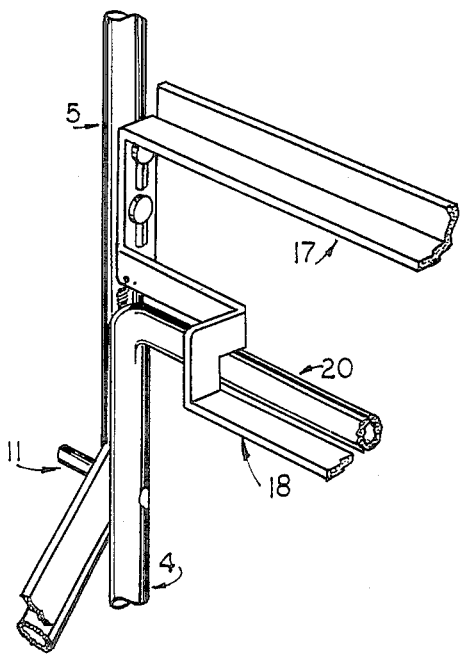
FIG. 4 is an enlarged detailed perspective view of one side of the service latch.
Figure 5:
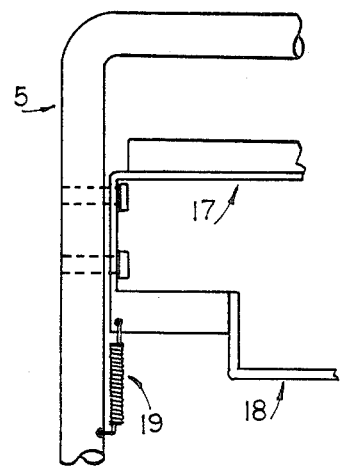
FIG. 5 is a detailed elevational view of the part of the latch shown of FIG. 4.

The upper portion of the movable frame assembly also includes a service latch, generally designated 16, with a controlling bar 17, a transverse rod 18 and springs 19, shown on FIGS. 1, 4 and 5, the lower end of each said spring is mounted on a side-member 5 of the movable frame assembly, and the upper end is engaged with the service latch 16.

The controlling bar 17 of the service latch 16 is positioned a suitable distance from the handle 15 so that it can be conveniently gripped by the operator together with said handle and pulled closer to the handle. Normally, the movable frame assembly is in its erected position, with its upper portion resting against the projecting pins 11, the controlling bar 17 of the latch 16 is released, the latch 16, pulled downward by the springs 19 stays in its lower position, and the transverse rod 18 of the latch, being engaged with horizontal bar 20 of the immovable frame assembly, prevents the upper part of the movable frame assembly 1 and, consequently, the handle of the cart, from its backward pivotal movement (FIGS. 1,2 and 5).

So long as the forward pivotal movement of the handle 15 is checked by the projecting pins 11 and its backward movement—by the latch 16, normally engaged with horizontal bar 20, the handle 15 of the cart becomes locked between said projecting pins and the latch 16, the diagonal portions 14 of the movable frame assembly are aligned with the diagonal links 3 and the whole structure represents a braced, stable configuration, the handle 15 is rigidly fixed upon the horizontal bar 20 of the immovable frame assembly, said handle can be used for pushing, pulling and tilting the cart in any direction (FIGS. 1, 2 and 4).

When the controlling bar 17 is pulled by the operator towards the handle 15, the latch 16 moves into its upper position, the transverse rod 18 disengages from the horizontal bar 20 and thus releases the handle 15 of the cart for its backward pivotal movement (FIGS. 4 and 5).

When the cart is in its collapsed position, as shown on FIG. 6, the cross bar 8 of the support member 6 are disengaged from the hook-shaped lugs 10 and slid down the vertical members 4. The diagonal links loosely hang along the vertical members 4 and so do the diagonal portions 14 of the movable frame assembly. The front legs 12 together with the front axle 21 come close to the rear axle 22 thus forming a space saving structure secured in this position by the lower latch 23.

The basket 24 pivots upwardly into a folded position and is secured in this position by the upper latch 26, said latch engages with the handle 15 of the cart.

To put the cart into the operational position, the latches 23 and 26 are disengaged, the cross-bar 8 of the support member 6 is slid upward along the vertical members 4 and is engaged with the hook-shaped lugs 10 as illustrated by FIGS. 2 and 9. The spring 13 secures the cross-bar on said lugs.

The braces 7 prop against the diagonal links 3 forming a rigid triangular structure, and through the means of said links keep the movable frame assembly in the erected position, the upper part of said movable frame assembly rests with its side members 5 against the projecting pins 11, the service latch 16 is engaged with the horizontal bar 20 of the immovable frame assembly, thus making the whole structure rigid and stable, the basket 24 unfolded downward, the bottom rods of said basket are resting upon the pivot 25 which extends between the lower ends of the diagonal links 3.

Figure 7:
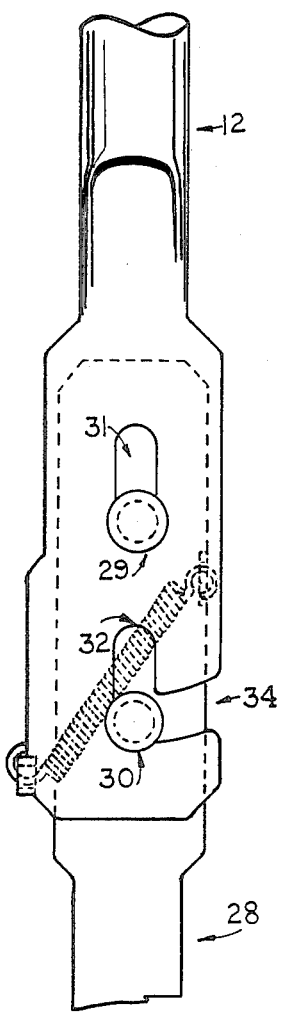
FIG. 7 is an enlarged detailed elevational view of the joint in its lower position.
Figure 8:
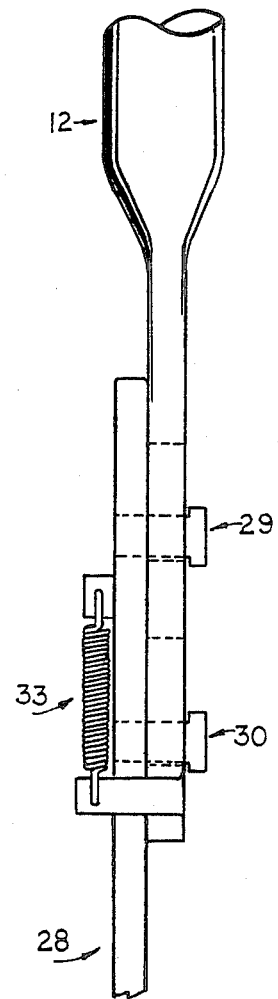
FIG. 8 is a side elevational view of the same joint.

The invention further comprises two joints, each of which is positioned on the bottom part of front legs 12 (FIGS. 7 and 8).

A joint, generally designated 27, includes a shank 28 with a pivot pin 29 and a controlling pin 30, said pins are inserted through the oblong openings 31 and 32 respectively, and secured in said openings by means of flat heads.

Joint 27 further includes a spring 33 mounted on the bottom part of the front leg 12 with one end, and on shank 28 with the other. The pins 29 and 30 can move up and down in the oblong openings 31 and 32 respectively, thus putting the shank 28 with a front wheel 35 on it in the upper or lower position. Normally the shank 28 is aligned with the front leg 12 and is in its upper position (not shown), the front leg 12 being pushed downward by the weight of the cart, resistance of the ground pushing the wheel and the shank upward in relation to the leg.

In said upper position the controlling pin 30 is in the upper end of the oblong opening 32 locked between its sidewalls, thus preventing the shank 28 from its pivotal movement in any direction.

Figure 10E:
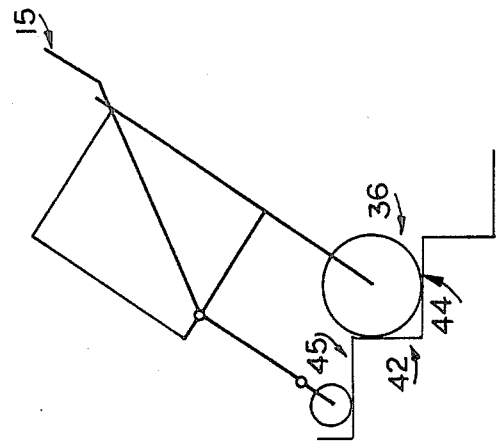
FIGS. 10A–10E is kinematic diagrams of the cart illustrating the process of climbing stairs.
Figure 10B:
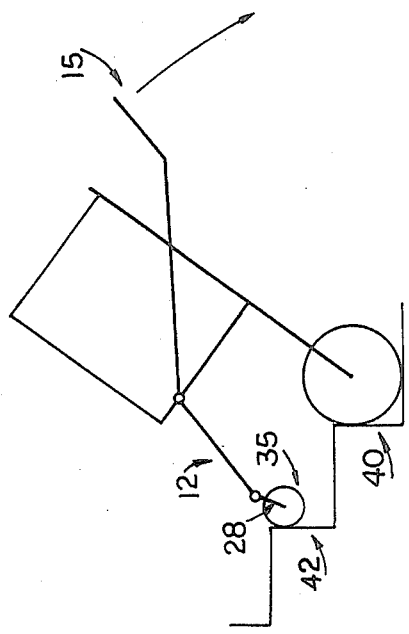
Figure 10D:
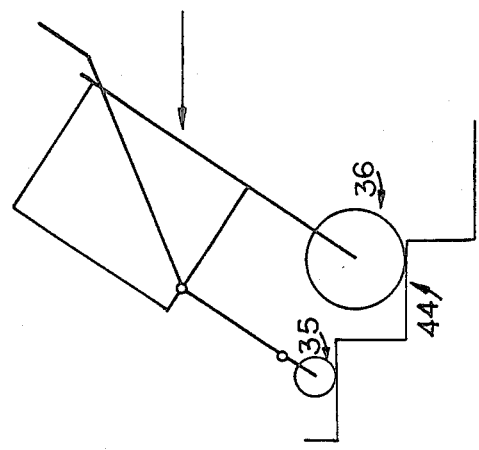
Figure 10A:
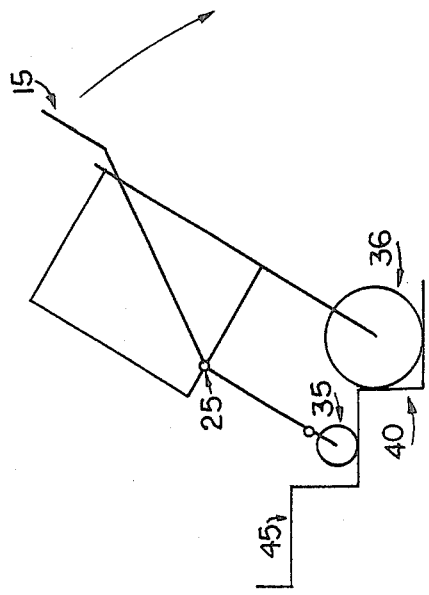
Figure 10C:
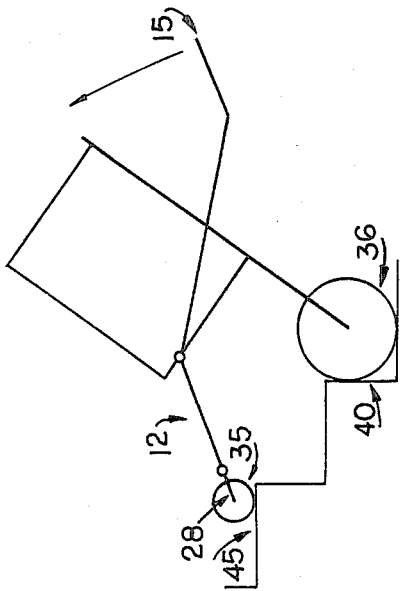

If, however, the front leg 12 is lifted from the ground, the shank 28 moves downward under the weight of the wheel carried thereon and the pull of the spring 33. In its lower position, shown on FIGS. 7 and 8, the controlling pin 30 is positioned right in front of the passage 34, thus making it possible for the shank to move around the pivot pin 29 (counterclockwise on FIG. 7), the controlling pin 30 going through the passage 34. Now, if in its forward movement the front wheel 35 meets some obstacle, such as a front wall of a step, the shank 28 can be deflected backward at a considerable angle, thus making it easier for the cart to pass over said obstacle. This feature facilitates the process of passing over ridges of steps by the front wheels of the cart, as illustrated by FIGS. 10B and 10C. The cart does not have to be tilted too far backward in the process of climbing stairs.

When the deflecting force is no longer applied to the front wheel 35, the shank 28, being pulled by the spring 33 comes back into alignment with the front leg 12, the controlling pin 30 goes backward through the passage 34. If the front leg 12 is now lowered upon the ground the upward pressure of the latter onto the front wheel 35 pushes the shank 28 into its upper position, the controlling pin 30 becomes locked in the upper part of the opening 32, and the shank 28 again constitutes a rigid, one piece structure with the front leg 12.

The process of climbing stairs is performed as follows: When approaching the stairs the operator tilts the cart backward thus lifting up the front wheels of the cart and stations the cart in a position with the front wheels put on top surface of the first step, as illustrated by FIG. 10A, the rear wheels of the cart prop against the front wall 40 of the first step. Now, by depressing the controlling bar 17 of the latch 16 the operator releases the latch and makes the handle 15 of the cart capable of moving downward. Pulling the handle 15 downward (clockwise on FIG. 10B), the operator rotates the movable frame assembly around the pivot 25 and lifts up the front legs 12 carrying front wheels 35. In their circular movement the front wheels 35 meet the front wall 42 of the second step (FIG.10B) The front wheel being lifted up from the ground, the shank 28, according to the previous description, is now capable of rotating around the pivot pin 29 (counterclockwise in relation to the front leg 12 on FIG. 10B).

When the front wheels 35 meet the resistance of the front wall 42 of the second step, the front legs of the cart are still going forward-upward in their circular movement around the pivot 25, the front wheels 35 are rolling upward along said front wall of the second step (FIG. 10B). As soon as the front wheels 35 in their upward movement pass the edge of the second step, and no longer meet the resistance of the front wall of said step, the shanks 28 together with the front wheels 12 return into their initial position, that is in alignment with the front legs 12. This position of the cart is illustrated by FIG. 10C. The rear wheels 36 are still resting on the floor and prop against the front wall 40 of the first step, the front wheels 35 are on the flat top surface 45 of the second step (FIG. 10C). By pulling the handle 15 upward the operator lifts the cart so that the rear wheels 36 are level with the flat top surface 44 of the first step, considerable portion of the whole weight of the structure is resting on the second step throught the means of the front wheels 35. Pushing the cart forward, the operator places the rear wheels 36 onto the top surface of the first step (FIG. 10D). Now the operator pushes the cart further forward and thus puts it in the position illustrated by FIG. 10E: The rear wheels are on top flat surface of the first step 44, resting against the front wall 42 of the second step, the front wheels are stationed upon the top flat surface 45 of the second step. This position is quite similar to the position on FIG. 7A, the only difference is that the whole cart is one step higher. By repeating the described motions the operator makes the cart climb as many steps as necessary.

When the climbing process is over and the cart is on a flat surface again, the operator moves the handle 15 upward, till the service latch 16 hits the horizontal bar 20 of the immovable frame assembly. By depressing the controlling bar 17 the operator makes it possible for the service latch 16 to pass over the horizontal bar 20 and now the controlling bar 17 should be released, the service latch 16, pulled by spring 19 goes in its lower position, engages with the horizontal bar 20 and locks the movable frame assembly in its erected position, the whole structure regains its rigidity and stability.

The cart is now ready for operation of flat surface. While a specific embodiment on the invention is shown and illustrated, it is quite apparent that the present invention is not limited to this embodiment and many minor changes of structure and operation can be made without departing from the scope of the invention.

What is claimed is:

1. A shopping cart capable of climbing stairs comprising:
   (a) an immovable frame assembly having two spaced apart vertical members interconnected at their upper portions by a horizontal bar integral therewith and at their lower portions forming rear legs carrying rear wheel means thereon;
   (b) a movable frame assembly having two spaced apart side members interconnected at their upper portions by a cross-member integral therewith and at their lower portions forming front legs carrying front wheel means thereon, said movable frame assembly is pivotally connected to said immovable frame assembly and is alterable between an erected and collapsed positions;
   (c) a plurality of link means pivoted by their upper ends on the upper portions of said vertical members and with their lower ends—on the lower portions of said side-members, by means of said link means the pivotal connection of said movable and immovable frame assemblies is provided;
   (d) a basket mounted on the upper portion of said immovable frame assembly;
   (e) a support member comprising a cross-bar and two spaced apart braces integral therewith, said cross-bar is slidably positioned over said vertical members, said braces prop against said link means, thus keeping said front legs apart from said rear legs;
   (f) a supporting spring means wherewith said movable frame assembly may be kept in the erected position.

2. A shopping cart, according to claim 1, wherein said braces are pivotally connected by their ends to the middle portions of said link means.

3. A shopping cart, according to claim 1, wherein said front legs have a pair of joints at their lower portions respectively, said joints making said front wheel means capable of being deflected backward by an oncoming obstacle, while the front legs are lifted from the ground, and returned back by pull of a return spring means when the obstacle is passed over.

4. A shopping cart according to claim 1, including stopping means positioned on the upper portions of said vertical members, the upper portions of said side-members are resting against said stopping means when the movable frame assembly is in the erected position.

5. A shopping cart, according to claim 4, including a pair of hook-shaped lugs, affixed to the lower portions of said vertical members respectively, said cross-bar is engageable with and securable on said hook-shaped lugs.

6. A shopping cart, according to claim 5, including a latch means, positioned on the upper portion of said movable frame assembly, said latch means comprising a controlling means positioned a suitable distance from said cross-member, and a securing means engageable with said horizontal bar, said latch means being capable of fixedly locking said movable frame assembly in the erected position.

7. A shopping cart, according to claim 6, wherein said basket is of a foldable type.

8. A shopping cart, according to claim 7, wherein said cross-bar being slid up said vertical members and secured on said hook-shaped lugs, said movable frame assembly obtains an erected position and forms, together with said immovable frame assembly, said link means and said braces, a stable, rigid configuration, pivotal movement of the movable frame assembly in any direction being checked by said stopping means and said latch means.

9. A shopping cart, according to claim 8, wherein said cross-bar being disengaged from said hook-shaped lugs and slid down said vertical members, said rigid configuration being collapsed, said link means together with said side-members loosely hang along said vertical members, said basket folded upward, the whole structure represents a space saving unit.

* * * * *